Patented Oct. 6, 1942

2,297,685

UNITED STATES PATENT OFFICE 2,297,685

METHOD OF PREPARING VEGETABLE PROTEINS

John C. Brier and Gerard W. Mulder, Ann Arbor, Mich., assignor to Welsh and Green, Incorporated, Chicago, Ill., a corporation of Delaware No Drawing. Application March 13, 1939, Serial No. 261,652

3 Claims. (Cl. 260—112)

This invention relates to vegetable proteins and methods of preparing the same. More particularly it relates to modified forms of soy bean meal and like products and to methods of preparing the same. It also relates to the insoluble proteinogenous materials contained in such vegetable products as soy beans, peanuts, other oleaginous seed materials, leguminous products and other protein containing vegetable materials, as well as to methods of isolating, more or less completely, such insoluble proteinogenous materials without effecting hydrolysis or other changes therein.

The prior art is familiar with materials such as soy bean meal which is the crushed residue remaining after at least the greater proportion of oily matter has been removed from soy beans.

Soy bean meal may be further treated physically to produce a more highly purified proteinogenous material. The co-pending application Serial No. 159,069 of the senior co-inventor of the instant application, John C. Brier, filed August 14, 1937, discloses a method of preparing proteins from soy bean meal which comprises mixing the latter with acidulated water so that the resulting solution when in equilibrium is substantially at the isoelectric point of the proteins present and separating said proteins from the resulting solution. This washing process, which of course removes only soluble materials, still leaves the fibrous and insoluble galactanous materials contained by the soy beans associated with the proteins.

These two products, soy bean meal and soy bean washed with acidulated water, are mixtures of vegetable proteins substantially unchanged chemically, with other vegetable non-proteinogenous materials. The latter product is at present not known to the art.

The prior art is also acquainted with so-called treated vegetable proteins. Those skilled in the art usually understand this term as signifying products that may be derived from soy bean meal or like materials by selective extraction of proteinogenous materials therefrom with strongly alkaline solutions, from which the proteins are reprecipitated by the addition of acids. Such treated vegetable proteins are practically free from fibrous and insoluble galactanous materials and other non-proteinogenous materials. They do not, however, represent the proteins of the soy bean in the form that they are contained in said beans, but are chemically changed products, for during the alkaline treatment of the soy bean meal the sensitive proteins contained therein are inevitably hydrolyzed to a greater or lesser extent. Those skilled in the art have been accustomed not only not to avoid such hydrolysis but to produce it purposely. Cone and Brown, the inventors of the intensive, prolonged alkaline extraction and digestion treatment described in U. S. Patent 1,955,375 state expressly in lines 77 to 85 on page 1 of their patent:

"The digestion in aqueous solution occasions a denaturing action, besides making possible the elimination of other seed constituents. In this treatment the protein becomes dispersible, that is, now capable of being taken up in an aqueous menstruum, and its ultimate viscosity may be controlled.

This statement clearly shows that during the alkaline extraction treatment the nature of the proteins present is modified; in particular, such modification is evidenced by a change in viscosity. It is moreover asserted that unless so treated the vegetable proteins are not dispersible in water.

In general it may be said that any method of isolating an approximately pure vegetable protein comprising a step in which the protein to be isolated is selectively dissolved in alkaline or acid aqueous media necessarily occasions at least some hydrolysis of the protein. Although the resultant product may be free of non-proteinogenous substances, possibly even homogeneous, and thus entitled to be called "pure," it still would not represent a pure form of the original protein. It would simply be a pure, modified protein.

We are not aware of any heretofore known products on the order of a comminuted defatted oleaginous seed material such as soy bean meal, which may or may not have been subjected to a washing with water at a pH approximately that of the isoelectric point of the protein contained therein to remove water soluble constituents, which do not contain substantially all the fibrous and insoluble galactanous material originally present in the oleaginous seeds, or of any product representing an approximately pure and unchanged form of the protein as contained in the original vegetable material, nor of any processes capable of producing such products.

It is therefore an important object of this invention to provide a comminuted defatted oleaginous seed product from which not only substantially all water soluble constituents but also a major proportion of fibrous and insoluble galactanous materials have been removed.

Another important object of this invention is to provide a more highly purified unchanged form of the insoluble proteins contained in vegetable materials, particularly with respect to freedom from fibrous and insoluble galactanous materials.

A further important object of this invention is to provide processes capable of producing these contemplated products.

Other and further important objects of this invention will become apparent from the appended description and claims.

In proceeding in accordance with this invention, a modified form of a protein containing vegetable material is used as starting material. The original source of the latter may be oleaginous seed material such as soy beans, cotton seed, peanuts, tung nuts, castor beans, linseed, cereals or grains, leguminous products or other suitable vegetable material. If oleaginous seed material is used, any dark colored shell or hull may first be removed, if desired, by a suitable method of decortication, after which the greater part or all of the oily matter present is removed, by extraction with, for instance, hexane, or by any other means, such as mechanical pressing, whereby a product on the order of soy bean meal is obtained.

In modifying the product on the order of soy bean meal thus obtained to make it a suitable raw material for the products and processes disclosed in this application, it is further treated to partially disintegrate its cellular structure and to remove the water soluble constituents therefrom. The latter include water soluble proteins, in particular, albumin proteins, carbohydrates, hemicelluloses and galactans. In general our process contemplates a combined washing and steeping treatment of high protein meal residue obtained by extraction of oil from, say, linseed, cotton seed, or soy beans, with acidulated water such that the pH of the resultant mixture is at all times approximately, though not necessarily exactly, at the isoelectric point of the insoluble vegetable protein present. This step differs from the process disclosed in the co-pending application, Serial No. 159,069, by permitting the use of pH values varying substantially, although within definite limits depending on the particular vegetable material being treated, from the isoelectric point of the protein being isolated, and by prolonging the time of treatment from the two hours usually needed for washing purposes to as much as twenty-five to fifty hours. This prolonged steeping causes the cell material to swell, protein agglomerates to separate, and, in general, the soy bean meal or other material being treated to be rendered softer and made more suitable for a succeeding mechanically disintegrating step.

More particularly, we find that a prolonged leaching of the meal with acidulated water will effect a swelling and softening of the same accompanied by a complete extraction of the water soluble proteins, carbohydrates, hemi-celluloses and galactans. The specific acid used for controlling the pH may be varied. Acids that may be used include sulfurous, sulfuric, hydrochloric, citric, tartaric, lactic, malic, acetic, succinic, benzoic and others. Sulfurous and hydrochloric acids are preferable because neither tends to cause discoloration of the meal and both are relatively cheap. Sulfurous acid particularly promotes the swelling of the meal. Generally a pH of between 3.8 and 5.4, and preferably between 4.0 and 4.9, is used for the isolation of globulin, the chief protein present in soy beans, which has an isoelectric point of 4.4. When hydrochloric acid is used, about 2.8 per cent by weight of acid of 20° Bé. is usually necessary to effect a suitable pH in the wash water. This figure, however, is not valid for all soy bean meals, for variations in the climatic and soil conditions under which the beans were grown may cause variations in composition which have to be compensated for.

The extraction of water soluble constituents is promoted by carrying out this treatment with acidulated water as counter-current leaching or by the repeated decanting of the supernatant liquid which is then replaced with fresh acidulated water. We have, for instance, successfully used four counter-current washes using a total amount of water about twenty-five times the weight of the protein meal being leached, or three successively replaced batches of acidulated water removed by decantation amounting to forty times the weight of the meal.

The residue left after this treatment with acidulated water is the raw material for the products and processes contemplated by this invention. It contains intercellular fiber, insoluble galactans and protein. If originally used beans were not decorticated, the residue will also contain hull-fiber. The term "fibrous and insoluble, galactanous materials" as used herein signifies the insoluble non-proteinogenous constituents of the thus prepared starting material, while the term "soluble constituents" refers to the materials capable of being removed by this leaching with acidulated water.

We have discovered by microscopic observation that when the residue from the leaching with acidulated water is subjected to a suitable combined tearing and abrading treatment in the presence of water, as when it is wet-burred in a manner similar to the wet-burring of corn starch, the fiber and galactans present tend to string out in long fibrils, whereas the protein agglomerates are broken up and individual spherical protein particles are released. We have further discovered that when it is attempted to cause the paste resulting from the treatment just described to pass through a suitable screen while water is simultaneously sprayed thereon, the protein particles, being round, pass through the screen while fibers and galactanous materials are washed off the screen. In this manner it is possible to effect a good separation of proteinogenous and non-proteinogenous materials.

The milling of the sludge left from the leaching with acidulated water is readily accomplished by one skilled in the art of wet burring, who will be able to properly adjust the variable factors of this process so as to obtain the desired particle sizes and shapes. These factors include the amount of water used, the size and speed of the mills, the tightness with which the burrs are set, the character of the burr mill surfaces and the like.

The time required for milling is reduced materially by carrying out this step at an elevated temperature. At +140° F., for instance, the rate of burring is approximately four times the rate at +70° F.

This milling is most suitably effected at or around the pH representing the isoelectric point of the protein being isolated. The addition of more acid may be necessary to maintain this acidity.

The exact size, shape and material of construction of the screen used may be varied widely. For laboratory purposes a flat shaking screen of silk bolting cloth has been found suitable, whereas an octagonal rotating trommel of the type presently used in the starch industry would probably best meet the requirements of commercial plant-scale operation. The particular mesh size of the screen should be adapted to the grinding conditions used. We have successfully used screen mesh sizes varying from 90 to 200 mesh.

Part of the protein may adhere to the fibrous and galactanous material, and reburring and re-screening of the tailings from the first wet screening may be effected to obtain a more perfect recovery of proteins. A repetition of the process will after several cycles yield diminishing returns; the final tailings, after the optimum number of wet screenings has been accomplished, will still contain some protein and may be dried and sold as cattle feed.

The protein suspension washed through the screen is collected in a tank and the suspended protein is allowed to settle out. This settling is very rapid and complete if the pH is maintained within the range of the isoelectric point of the protein. A range from pH 4.0 to 4.9 has been found suitable for most purposes.

The protein thus thickened by sedimentation may be easily filtered by means of standard filtration and equipment such as a plate and frame filter press or a continuous rotary filter. We find that a dense cake containing 70% moisture may readily be obtained in a plate and frame filter press using one inch frames and pressures from 5 to 9 pounds per square inch.

This filter cake may be crushed and dried in any suitable manner. The drying should preferably be carried out below 60° C. We have found a convenient and rapid method of drying this cake in passing it through an extruder to form small strings of wet protein. The surface area of the protein is thus greatly increased whereby the drying is accelerated considerably.

The dried cake is broken up, for instance, in a hammer or ball mill, and the granulated product thus formed represents the finished product.

The process disclosed hereinbefore may be applied to the production of soy bean protein with excellent results.

The following detailed description of a preferred form of the present invention will serve as an example illustrating the working of this invention.

Solvent extracted soy bean meal is mixed with water containing sulfur dioxide maintained at about 100° F. Enough sulfur dioxide is added to maintain the pH of the resulting slurry within the range of from 4.5 to 5.0. This slurry is kept at the indicated pH value and temperature for 35 hours during which time the supernatant liquid is decanted three times and replaced with fresh water, these decantations effecting removal of soluble carbohydrates, albumins, and other substances. The ratio, by weight, of meal to water used during this combined washing and steeping treatment is 1 to 40.

After this leaching, the solid content of the slurry is adjusted so as to be one-seventh of the total weight of the slurry. The temperature is then raised to 120° F. Burring is carried out in a 16-inch burr mill, and screening, settling, filtration and drying is effected as disclosed hereinbefore.

It is also within the scope of this invention to utilize the disclosed differences in particle size, shape and gravity between protein and non-proteinogenous material to effect separation in any manner capable of effecting such results, such as centrifugal separation, differential settling, with or without washing, mechanical concentration methods on the order of flotation, and other conventional methods so well known to the prior art that they need not be discussed.

It can thus be seen that our process is carried out easily and conveniently with standard equipment well known to the chemical industry. The protein is at no time in solution, and the process consists of a series of mechanical or physical rather than chemical separations. The result is that the protein product prepared according to this invention can be produced at a cost substantially below those of comparable commercial protein products such as glue, casein, treated vegetable proteins and the like. A substantial factor in making possible this low cost is the excellent yields obtained by our processes. An analysis of average soy bean meal obtained by extraction of oils shows a content of 45.6 per cent of insoluble protein. We find recovery of 90 per cent or more entirely feasible, a yield not obtainable in the alkaline extraction-digestion treatment heretofore used in the manufacture of treated vegetable proteins.

The efficiency of our mechanical separating step is indicated by the fact that careful burring and screening allows us to consistently prepare a protein containing between 0.75 and 0.25 per cent of fibrous and insoluble galactanous material. By the use of extreme care and by numerous repetitions of the separating step, it is possible to prepare a protein containing even less than 0.25 per cent of fibrous and insoluble galactanous material. This product is a substantially pure, chemically unchanged protein. However, a product containing the fractional percentage of fibrous and insoluble galactanous material above indicated is entirely satisfactory for practical purposes. It may easily be put into solution by the method described in our co-pending application, Serial No. 192,966, to yield a homogeneous dispersion of low viscosity.

The advantages realized by the use of the novel processes disclosed hereinbefore are particularly apparent when processes on the order of those disclosed in United States Patent No. 1,955,375 are considered. Processes of this type involve the selective extraction and digestion of proteins. Two disadvantages attend this extraction. The first relates to the fact that a part of the insoluble protein is rendered soluble, and hence lost, by hydrolysis due to the long alkaline treatment necessary for complete extraction. The second refers to the fact that the insoluble, non-proteinogenous residue forms a sticky sludge, from which it is extremely difficult to separate the protein containing liquor efficiently. Hence a loss occurs at this point as well. The treated vegetable protein obtained by these processes is a fiber-free drastically hydrolyzed product, typifying all prior art treated vegetable proteins.

When our novel chemically unchanged vegetable protein containing less than 0.75 per cent of fibrous and insoluble galactanous material is compared with treated vegetable proteins, in paper coating work, by being put in solution according to the methods disclosed in our copending application Serial No. 192,966, it is found to be equal to the prior art composition in pick tests, smoothness, and brightness, and superior as to "brushability," printability, and strength. The last fact may also be differently stated by saying that the use of more treated vegetable protein per pound of clay than of our novel protein is required to obtain equal strength in coated paper sheets. The reason for this fact is apparent on consideration of the drastic hydrolysis with consequent molecular breakdown and lower adhesive strength which forms a step in the processes heretofore used for the production of treated vegetable proteins. This drastic hydrolysis has heretofore been necessary to secure low viscosity and dispersability. Our novel protein, however, due to its negligible content of fibrous and insoluble galactanous materials does not require severe hydrolysis to yield homogeneous dispersions of exceptionally low viscosity. By the use of our novel protein it is therefore possible to obtain at the same time a superior strength and an exceptionally good flow.

A vegetable protein prepared according to the priciples of the present invention is also superior to casein for paper coating purposes.

Protein prepared according to the detailed directions in the specific example described hereinabove may be put into solution by the method described in our co-pending application, Serial No. 192,966. From the resulting solution there may be prepared a coating color containing 16 parts by weight of protein per 100 parts coating clay and having a total solid content of 40 per cent at a viscosity of 200 centiposes. This coating color brushes well and gives a pick of 8 when coated at 15 pound coat weight on No. 4 book paper.

When tested in a commercial mill run, a coating color prepared as disclosed in said example using 14.1 parts of protein per 100 parts of clay gave a pick of 6.5, the same value as that obtained by the use of a commercial coating color similarly prepared from casein and tested during the same mill run and on the same raw stock, while in the K and N ink test the novel composition appeared superior to the casein preparation in certain respects.

Our invention, in its broader aspects, may be said to include the isolation of unchanged protein by purely physical means. The latter include the step of utilizing the differences in size, shape and gravity of particles as between protein and fibrous and insoluble galactanous materials which may be produced by suitable comminution of defatted oleaginous vegetable material which has been subjected to a leaching with acidulated water. We are aware that numerous details of the process may be varied through a wide range without departing from the principles of this invention, and we, therefore, do not purpose limiting the patent granted hereon otherwise than necessitated by the scope of the appended claims.

We claim as follows:

1. The process of isolating the protein of oleaginous seed material which includes comminuting and defatting said seed material, steeping and washing the seed material in water to remove water soluble material, burring the washed material in the presence of water to the extent of producing rounded protein particles and fibrilliform particles of fibrous and galactanous material, screen off the fibrilliform particles in the presence of water to prepare an aqueous protein suspension, settling the protein from said suspension, and separating the settled protein, the water used in said steeping, washing, burring, screening, suspension and settling being acidulated and approximately at the isoelectric point of the protein isolated.

2. The process of isolating the protein of soya bean which includes comminuting and defatting soya bean, steeping and washing the resulting material in water to remove water soluble material, burring the comminuted, defatted, washed material in the presence of water to reduce the same to fibrilliform particles of fibrous and galactanous material and to rounded protein particles capable of being separated from the fibrilliform particles by wet-screening and of settling from an aqueous suspension, screening the burred material in the presence of water to remove fibrous and galactanous material and to prepare an aqueous suspension of protein particles, settling the protein particles, and separating the settled protein particles, all water contacting said soya bean material in said process being acidulated and having a pH of from 3.8 to 5.4.

3. The process of isolating the protein of soya bean which includes comminuting and defatting soya bean, steeping and washing the resulting material in water to remove water soluble material, burring the comminuted, defatted, washed material in the presence of water to break up protein agglomerates and to set free individual rounded protein particles capable of settling from an aqueous suspension and to cause fibrous and galactanous material to string out in the form of long fibrils, screening the burred material to remove fibrilliform fibrous and galactanous material and to leave an aqueous suspension of protein particles, settling the protein particles and filtering off and drying the settled protein particles, all the water used in said process having a pH approximating the isoelectric point of said protein.

JOHN C. BRIER.
GERARD W. MULDER.